(12) United States Patent
Tokoyoda et al.

(10) Patent No.: US 11,069,502 B2
(45) Date of Patent: Jul. 20, 2021

(54) DC CIRCUIT BREAKER

(71) Applicant: Mitsubishi Electric Corporation, Tokyo (JP)

(72) Inventors: Sho Tokoyoda, Tokyo (JP); Takashi Inagaki, Tokyo (JP); Kenji Kamei, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/969,206

(22) PCT Filed: Apr. 19, 2018

(86) PCT No.: PCT/JP2018/016144
§ 371 (c)(1),
(2) Date: Aug. 12, 2020

(87) PCT Pub. No.: WO2019/202703
PCT Pub. Date: Oct. 24, 2019

(65) Prior Publication Data
US 2020/0411271 A1    Dec. 31, 2020

(51) Int. Cl.
*H01H 85/02* (2006.01)
*H01H 85/12* (2006.01)
*H01H 85/46* (2006.01)

(52) U.S. Cl.
CPC ........ *H01H 85/12* (2013.01); *H01H 85/0241* (2013.01); *H01H 85/46* (2013.01); *H01H 2085/0258* (2013.01); *H01H 2085/0283* (2013.01)

(58) Field of Classification Search
CPC .... H01H 85/0241; H01H 85/12; H01H 85/46; H01H 2085/0258; H01H 2085/0283; H01H 2085/466
See application file for complete search history.

(56) References Cited

U.S. PATENT DOCUMENTS

| 10,403,449 | B2 | 9/2019 | Ka et al. | |
| 2002/0048133 | A1* | 4/2002 | Jakwani | H01T 4/06 |
| | | | | 361/118 |
| 2005/0243495 | A1* | 11/2005 | Ramarge | H01C 7/126 |
| | | | | 361/118 |

(Continued)

FOREIGN PATENT DOCUMENTS

| EP | 3010030 A1 | 4/2016 |
| EP | 3107172 A1 | 12/2016 |

(Continued)

OTHER PUBLICATIONS

International Search Report (PCT/ISA/210) dated Jul. 17, 2018, by the Japan Patent Office as the International Searching Authority for International Application No. PCT/JP2018/016144.

(Continued)

*Primary Examiner* — Jacob R Crum
(74) *Attorney, Agent, or Firm* — Buchanan Ingersoll & Rooney PC (57) ABSTRACT

A DC circuit breaker includes a fuse unit to interrupt a large current with a fuse, and the fuse unit includes a high-speed disconnector that is connected in parallel to the fuse and is opened when a fault current is detected.

7 Claims, 5 Drawing Sheets

(56) References Cited

U.S. PATENT DOCUMENTS

| | | | | |
|---|---|---|---|---|
| 2007/0201177 A1* | 8/2007 | Kladar | ................... | H01H 85/44 |
| | | | | 361/118 |
| 2014/0078793 A1* | 3/2014 | Sivakumar | .............. | H02S 40/36 |
| | | | | 363/55 |
| 2015/0229118 A1* | 8/2015 | Hasunuma | ................ | H01C 7/02 |
| | | | | 361/93.8 |
| 2016/0197604 A1 | 7/2016 | Iwabuki et al. | | |
| 2018/0040443 A1* | 2/2018 | Yokota | ................... | H01H 37/34 |

FOREIGN PATENT DOCUMENTS

| | | | |
|---|---|---|---|
| EP | 3306635 A1 | 4/2018 | |
| EP | 3489981 A1 | 5/2019 | |
| JP | 2013008698 A | 1/2013 | |
| JP | 2016225198 A | 12/2016 | |
| WO | 2012100831 A1 | 8/2012 | |
| WO | 2015011949 A1 | 1/2015 | |
| WO | 2016056274 A1 | 4/2016 | |
| WO | 2018016179 A1 | 1/2018 | |

OTHER PUBLICATIONS

Written Opinion (PCT/ISA/237) dated Jul. 17, 2018, by the Japan Patent Office as the International Searching Authority for International Application No. PCT/JP2018/016144.

H. Ito et al., "Instability pf DC Arc in $SF_6$ Circuit Breaker", PE-057-PWRD-0-11-1996 IEEE, 1997, pp. 1-6.

Extended European Search Report dated Apr. 15, 2021 issued in corresponding European Patent Application No. 18915763.9 (7 pages).

* cited by examiner

DC CIRCUIT BREAKER

FIELD

The present invention relates to a DC circuit breaker for a high voltage or a medium voltage.

BACKGROUND

There are increasing demands for development of a high-voltage DC circuit breaker in order to achieve multi-terminal high-voltage DC transmission. In multi-terminal high-voltage DC transmission, a plurality of DC side systems are connected to an AC side system by a converter. In multi-terminal high-voltage DC transmission, in a case where a fault such as a short circuit or a ground fault occurs in a portion of the DC side systems and a fault current that is a larger current flows to a DC side system, it is necessary to prevent influences of the fault on a DC side system in which no fault has occurred and only a load current that is a small direct current flows by interrupting only the DC side system where the fault has occurred. Unlike AC circuit breakers, there is no industrial standard so far both domestically and internationally for high-voltage DC circuit breakers; however, various direct current interrupting methods have been proposed and are being developed in various countries.

In a case of applying a mechanical DC circuit breaker, such as a gas circuit breaker and a vacuum circuit breaker, to multi-terminal high-voltage DC transmission, it is required to interrupt a direct current within a predetermined time when a DC fault occurs. This requirement is called "high-speed operation request duty". In a multi-terminal high-voltage DC transmission system, when a DC system voltage drops below a threshold of an operable voltage of a converter that connects an AC side system and a DC side system to each other, the converter itself stops its operation and this causes system collapse. Therefore, in order to maintain operation of systems in multi-terminal high-voltage DC transmission even when a ground fault or a short circuit occurs, it is necessary to interrupt a fault current by a DC circuit breaker promptly after occurrence of a fault, thereby preventing the DC system voltage from dropping to or below the threshold.

According to the international research results to date by model system analysis, the high-speed operation request duty required of a DC circuit breaker is defined such that the time from occurrence of a fault to interruption of a fault current is 10 ms or less.

Patent Literature 1 discloses a circuit breaker in which an interruption operation is performed by a breaker in a small current range and by a fuse in a large current range.

CITATION LIST

Patent Literature

Patent Literature 1: Japanese Patent Application Laid-open No. 2013-8698

SUMMARY

Technical Problem

As described above, in multi-terminal high-voltage DC transmission, it is required to interrupt a large current within 10 ms after occurrence of a fault. Therefore, in a case of applying the invention disclosed in Patent Literature 1 to multi-terminal high-voltage DC transmission, it is necessary to shorten the interruption time of a fuse that interrupts a large direct current. The interruption time of a fuse is determined by an interruption current value based on interruption characteristics. In order to cause a fuse to interrupt current at a high speed, the fuse needs to be interrupted by a current as small as possible. Therefore, in a fuse that interrupts current at a high speed, a margin for a load current with respect to an interruption current is small. In the invention disclosed in Patent Literature 1, a load current flows through a fuse, and therefore the fuse may be deteriorated even by flow of the load current. When the fuse is deteriorated, there is a possibility that the fuse is blown due to the load current, resulting in interruption of a current even if no fault has occurred.

The present invention has been achieved in view of the above problems, and an object of the present invention is to provide a DC circuit breaker that prevents interruption of a current at a time other than occurrence of a fault.

Solution to Problem

In order to solve the above problems and achieve the object, an aspect of the present invention includes a fuse breaker unit to interrupt a large current with a fuse. The fuse breaker unit includes a high-speed disconnector that is connected in parallel to the fuse and is opened when a fault current is detected.

Advantageous Effects of Invention

According to the present invention, there is an effect where it is possible to provide a DC circuit breaker that prevents interruption of a current at a time other than occurrence of a fault.

DESCRIPTION OF EMBODIMENTS

A DC circuit breaker according to embodiments of the present invention will be described in detail below with reference to the accompanying drawings. The present invention is not limited to the embodiments.

First Embodiment

Figure 1:
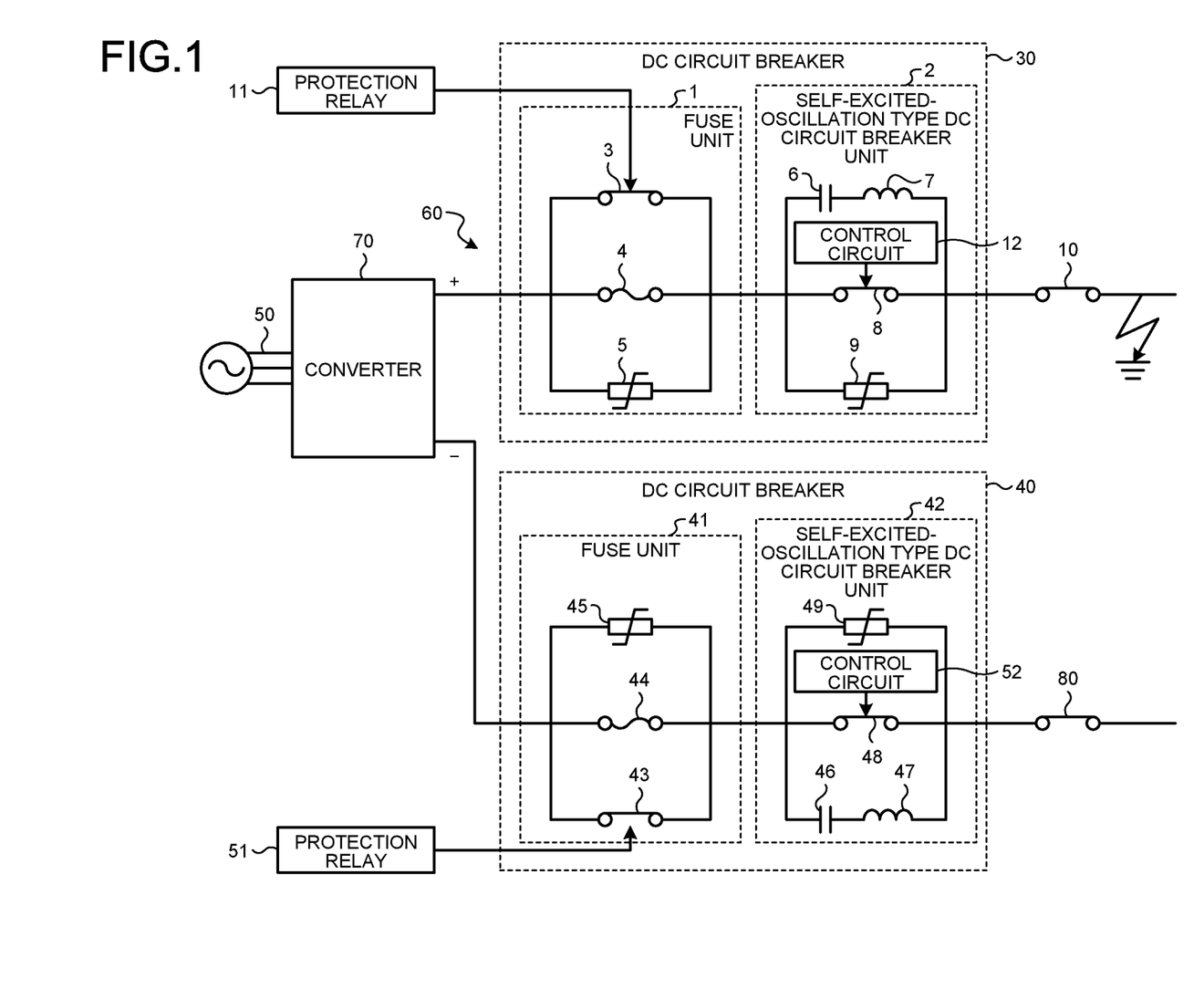
FIG. 1 is a diagram illustrating a configuration of a DC circuit breaker according to a first embodiment of the present invention.

FIG. 1 is a diagram illustrating a configuration of a DC circuit breaker according to a first embodiment of the present invention. DC circuit breakers 30 and 40 according to the first embodiment are connected to a converter 70 that connects an AC side system 50 and a DC side system 60 to each other. Although only the DC side system 60 is connected to the converter 70 here in order to avoid complicated descriptions, a plurality of DC side systems may be connected to the converter 70. The DC circuit breaker 30 includes a fuse unit 1 serving as a fuse breaker unit that is connected to the converter 70 and interrupts a large current with a fuse 4, and a self-excited-oscillation type DC circuit breaker unit 2 that is connected to a load side and interrupts a load current. The fuse unit 1 is constituted by the fuse 4 that interrupts a fault current, a high-speed disconnector 3 for preventing deterioration of the fuse 4 and diverting a fault current, and a first metal oxide arrester 5 that suppresses an overvoltage after interruption of a direct current. When a protection relay 11 detects a fault, the high-speed disconnector 3 opens contacts and starts an interruption operation. The time required from when a fault current is detected by the high-speed disconnector 3 to when the disconnector 3 is opened is less than 10 ms.

The self-excited-oscillation type DC circuit breaker unit 2 is constituted by a breaker unit 8 that is constituted by a mechanical switch such as a gas circuit breaker using an insulating gas such as $SF_6$, a capacitor 6 and a reactor 7 that cause generation of a self-excited oscillation phenomenon of an arc, a second metal oxide arrester 9 that suppresses an overvoltage after interruption of a direct current, and a control circuit 12 that controls opening and closing of the breaker unit 8. The self-excited-oscillation type DC circuit breaker unit 2 employs a direct current interrupting method that forms current zero by using a current-expansion vibration phenomenon due to electrical interaction between an arc generated between electrodes of the breaker unit 8 and the capacitor 6 and the reactor 7 that are connected in parallel to the breaker unit 8. The second metal oxide arrester 9 may have characteristics that are the same as or different from those of the first metal oxide arrester 5. In general, the second metal oxide arrester 9 is used for interrupting a small current, and therefore it is possible to apply an arrester smaller than the first metal oxide arrester 5 to the arrester 9. Since the self-excited-oscillation type DC circuit breaker unit 2 interrupts a load current with which voltage does not drop to or below an operable voltage of the converter 70, unlike the fuse unit 1, it is not necessary for the DC circuit breaker unit 2 to perform high-speed interruption.

The DC circuit breaker 40 includes a fuse unit 41 serving as a fuse breaker unit that is connected to the converter 70 and interrupts a large current with a fuse 44, and a self-excited-oscillation type DC circuit breaker unit 42 that is connected to a load side. The fuse unit 41 and the self-excited-oscillation type DC circuit breaker unit 42 are similar to those in the DC circuit breaker 30. That is, a high-speed disconnector 43, the fuse 44, a first metal oxide arrester 45, a capacitor 46, a reactor 47, a breaker unit 48, a second metal oxide arrester 49, and a control circuit 52 are similar to the high-speed disconnector 3, the fuse 4, the first metal oxide arrester 5, the capacitor 6, the reactor 7, the breaker unit 8, the second metal oxide arrester 9, and the control circuit 12 of the DC circuit breaker 30. Note that, when a protection relay 51 detects a fault, the high-speed disconnector 43 opens contacts and starts an interruption operation.

Figure 2:
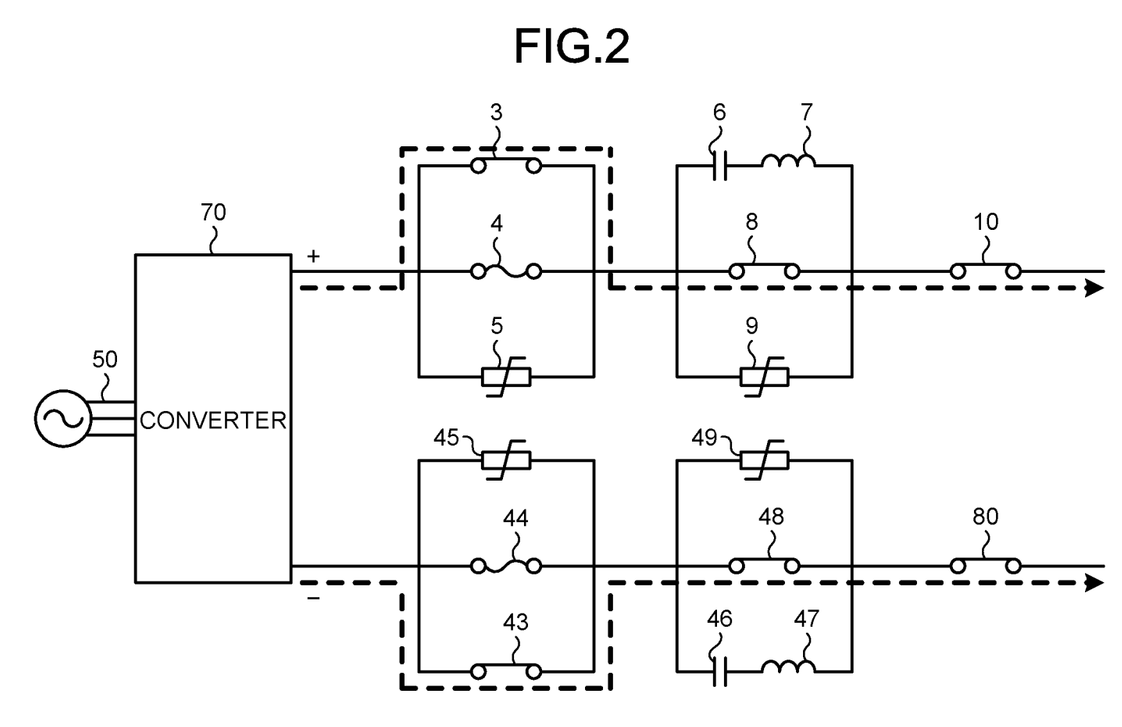
FIG. 2 is a diagram illustrating a current-flow path in the DC circuit breaker according to the first embodiment during a normal operation.

FIG. 2 is a diagram illustrating a current-flow path in the DC circuit breaker according to the first embodiment during a normal operation. On a positive electrode side, in order to prevent deterioration of the fuse 4 caused by flow of a load current, the fuse unit 1 does not cause the load current to flow to the fuse 4. Instead, the fuse unit 1 causes the load current to flow to the high-speed disconnector 3 that is connected in parallel to the fuse 4 as a bypass. Similarly, on a negative electrode side, in order to prevent deterioration of the fuse 44 caused by flow of a load current, the fuse unit 41 does not cause a load current to flow to the fuse 44. Instead, the fuse unit 41 causes the load current to flow to the high-speed disconnector 43 that is connected in parallel to the fuse 44 as a bypass.

Figure 3:
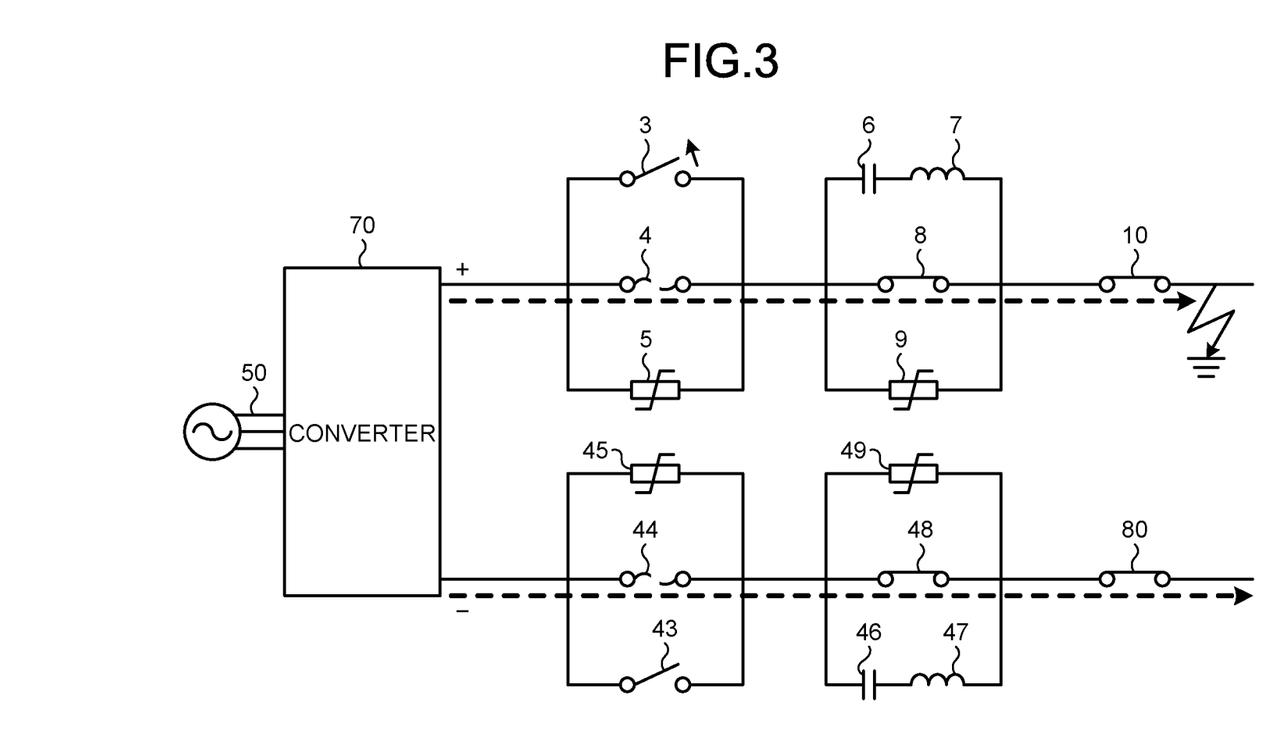
FIG. 3 is a diagram illustrating a current-flow path in the DC circuit breaker according to the first embodiment when a fault has occurred.

FIG. 3 is a diagram illustrating a current-flow path in the DC circuit breaker according to the first embodiment when a fault has occurred. It is assumed here that a short circuit between a positive electrode side and a negative electrode side has occurred. When a fault has occurred, on the positive electrode side, the high-speed disconnector 3 is opened in response to an instruction from the protection relay 11 that has detected the fault and a fault current is diverted to the fuse 4, so that the fault current can be interrupted in less than 10 ms after the detection of the fault. That is, when the fault current is interrupted, the high-speed disconnector 3 is opened in less than 10 ms after the detection of the fault. When the high-speed disconnector 3 is opened, a large direct current is diverted to the fuse 4, and the fuse 4 is blown and interruption is completed. Since the fuse 4 is automatically blown when a large current flows therethrough, it is not necessary to control a mechanical switch in a complicated manner with high accuracy.

Similarly, on the negative electrode side, the high-speed disconnector 43 is opened in response to an instruction from the protection relay 51 that has detected a fault and a fault current is diverted to the fuse 44, so that the fault current can be interrupted in less than 10 ms after the detection of the fault. That is, when the fault current is interrupted, the high-speed disconnector 43 is opened in less than 10 ms after the detection of the fault. When the high-speed disconnector 43 is opened, a large direct current is diverted to the fuse 44, and the fuse 44 is blown and interruption is completed. Since the fuse 44 is automatically blown when a large current flows therethrough, it is not necessary to control a mechanical switch in a complicated manner with high accuracy.

In a case of a ground fault on either the positive electrode side or the negative electrode side, it is also possible to cause only the electrode on which the ground fault has occurred to be interrupted. An overvoltage occurring after the DC circuit breaker 30 or 40 has interrupted a current is suppressed by the second metal oxide arrester 9 or 49 connected in parallel to the breaker unit 8 or 48. At this time, although a current flows via the second metal oxide arrester 9 or 49, the current that flows via the second metal oxide arrester 9 or 49 is interrupted by opening a disconnector 10 or 80 at any timing.

Figure 4:
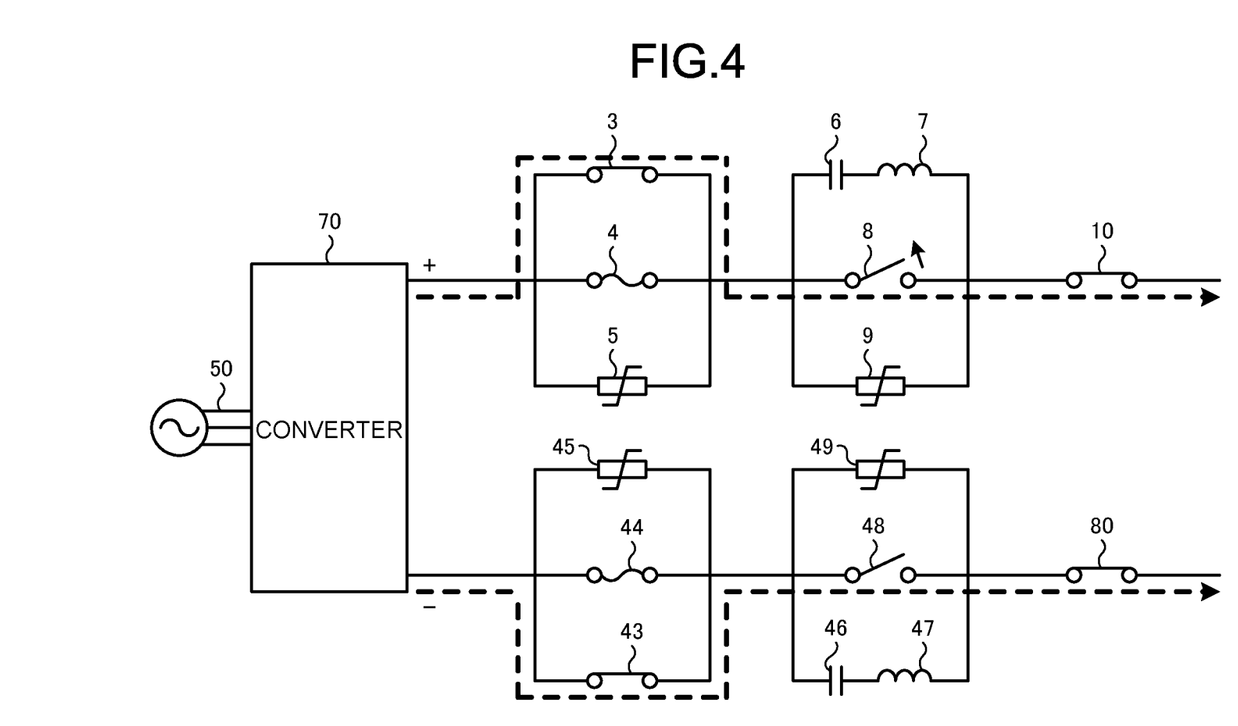
FIG. 4 is a diagram illustrating a current-flow path in the DC circuit breaker according to the first embodiment when a load current has been interrupted.

FIG. 4 is a diagram illustrating a current-flow path in the DC circuit breaker according to the first embodiment when a load current has been interrupted. When a load current is interrupted, it is not necessary to interrupt the load current at a high speed. Therefore, on a positive electrode side, the breaker unit 8 of the self-excited-oscillation type DC circuit breaker unit 2 is opened, so that the current is interrupted by self-excited oscillation. When the load current is interrupted, if the breaker unit 8 is opened in a required opening time at a required speed, interaction between an arc between electrodes of the breaker unit 8 and the capacitor 6 and the reactor 7 automatically causes generation of current-expansion vibration, so that current zero is formed and interruption is completed. Also, in a case of interrupting the load current, it is not necessary to control a mechanical switch in a complicated manner with high accuracy.

Similarly, on a negative electrode side, the breaker unit 48 of the self-excited-oscillation type DC circuit breaker unit 42 is opened, so that the current is interrupted by self-excited oscillation. In interrupting the load current, when the breaker unit 48 is opened in a required opening time at a required speed, interaction between an arc between electrodes of the breaker unit 48 and the capacitor 46 and the reactor 47 automatically causes generation of current-expansion vibration, so that current zero is formed and interruption is completed. Also, in a case of interrupting the load current, it is not necessary to control a mechanical switch in a complicated manner with high accuracy.

In the DC circuit breakers 30 and 40 according to the first embodiment, the fuses 4 and 44 are less likely to deteriorate because no current flows through the fuses 4 and 44 at normal times and when a load current is interrupted. Therefore, it is possible to prevent current interruption at a time other than occurrence of a fault.

In the DC circuit breakers 30 and 40 according to the first embodiment, a large current is not interrupted by the self-excited-oscillation type DC circuit breaker units 2 and 42, and therefore it is not necessary to increase the capacitances of the capacitors 6 and 46 and the reactors 7 and 47. Accordingly, the DC circuit breakers 30 and 40 according to the first embodiment can respond to a high-speed operation request duty with a small size and at low cost.

Second Embodiment

Figure 5:
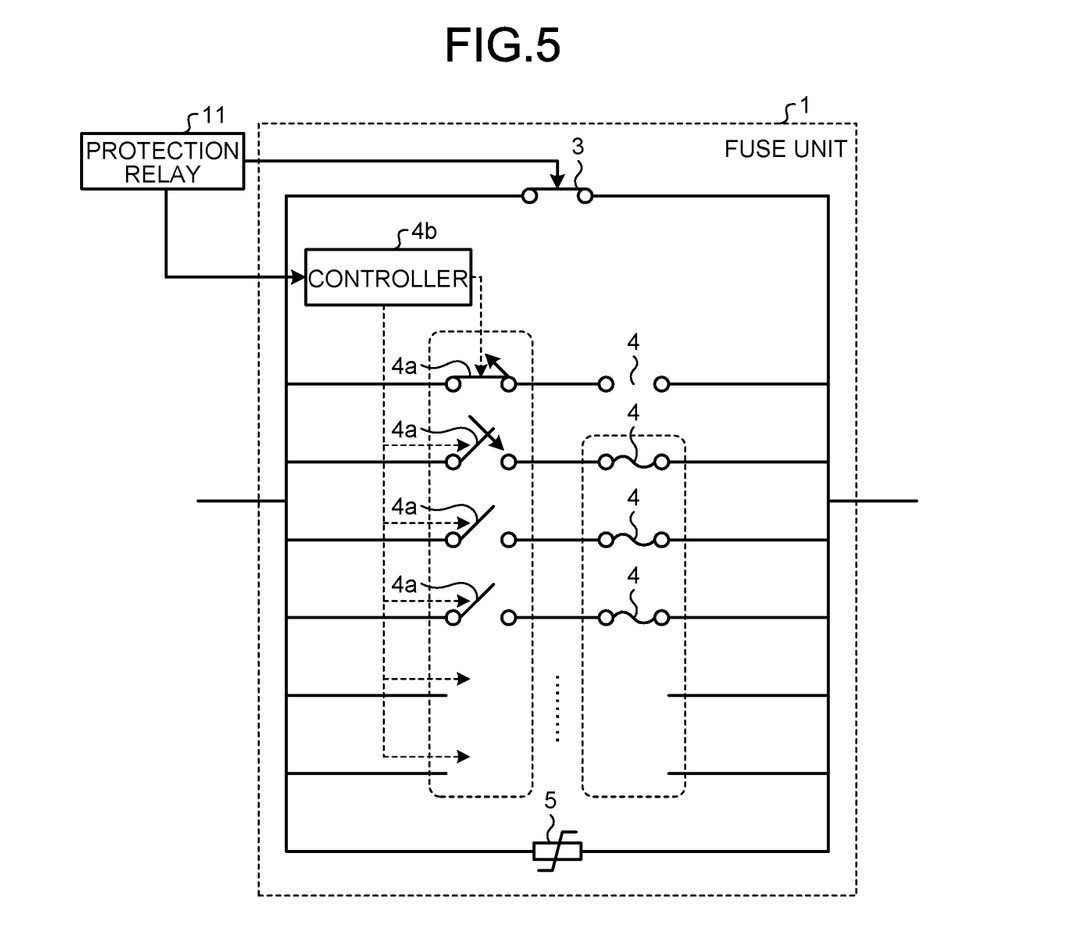
FIG. 5 is a diagram illustrating a configuration of a fuse unit of a DC circuit breaker according to a second embodiment of the present invention.

FIG. 5 is a diagram illustrating a configuration of a fuse unit of a DC circuit breaker according to a second embodiment of the present invention. The DC circuit breaker 30 according to the second embodiment is similar to the DC circuit breaker according to the first embodiment except for the fuse unit 1, and therefore descriptions thereof are omitted except for descriptions of the fuse unit 1. The fuse unit 1 of the DC circuit breaker 30 according to the second embodiment includes a plurality of fuses 4. The fuse unit 1 includes fuse switches 4a that are connected in series to the fuses 4 respectively and connect any of the fuses 4 to the high-speed disconnector 3 in parallel to each other, and a controller 4b that controls the fuse switches 4a.

The fuse 4 blown due to interruption of a fault current cannot be reused, and the blown fuse 4 needs to be replaced with a usable one in order to prepare for the next interruption of a fault current. As illustrated in FIG. 5, in the fuse unit 1 of the DC circuit breaker 30 according to the second embodiment, a plurality of fuses 4 are connected in parallel to the high-speed disconnector 3, and therefore, in a case where a fuse 4 being used is blown due to interruption of a fault current, it is possible to prepare for the next interruption of a fault current by switching from the blown fuse 4 to a spare fuse 4 by the fuse switches 4a. If the time from fault detection by the protection relay 11 to switching of the fuse switch 4a by the controller 4b is longer than the time from the fault detection by the protection relay 11 to opening of the high-speed disconnector 3, a current has been already interrupted at a time point when the fuse 4 is switched to the spare fuse 4. Therefore, the spare fuse 4 is not blown at the moment of switching to the spare fuse 4.

The DC circuit breaker 30 according to the second embodiment can respond to a high-speed interruption operation duty with a small size and at low cost, and does not require replacement of the fuse 4 after interruption of a fault current. Therefore, early recovery from a fault can be achieved.

Similarly to the fuse unit 1, the fuse unit 41 of the DC circuit breaker 40 according to the second embodiment can be configured to include a plurality of fuses 44.

The configurations described in the above embodiments are only examples of the content of the present invention. The configurations can be combined with other well-known techniques, and part of each of the configurations can be omitted or modified without departing from the scope of the present invention.

REFERENCE SIGNS LIST 1, 41 fuse unit, 2, 42 self-excited-oscillation type DC circuit breaker unit, 3, 43 high-speed disconnector, 4, 44 fuse, 4a fuse switch, 4b controller, 5, 45 first metal oxide arrester, 6, 46 capacitor, 7, 47 reactor, 8, 48 breaker unit, 9, 49 second metal oxide arrester, 10, 80 disconnector, 11, 51 protection relay, 12, 52 control circuit, 30, 40 DC circuit breaker, 50 AC side system, 60 DC side system, 70 converter.

The invention claimed is:

1. A DC circuit breaker comprising a fuse breaker unit to interrupt a large current with a fuse, wherein
   the fuse breaker unit includes:
   a plurality of fuses connected in parallel to each other,
   a plurality of switches connected in series to the fuses, respectively, and
   a controller to control the plurality of switches,
   a high-speed disconnector that is connected in parallel to the plurality of fuses and their respective switches and is opened when a fault current is detected, and
   a self-excited-oscillation type DC circuit breaker unit that is connected in series to the fuse breaker unit and interrupts a small current with a self-excited oscillation method.

2. The DC circuit breaker according to claim 1, wherein the fuse breaker unit includes a first metal oxide arrester that is connected in parallel to the fuses and the high-speed disconnector and suppresses an overvoltage after interruption of a direct current.

3. The DC circuit breaker according to claim 1, wherein the self-excited-oscillation type DC circuit breaker unit includes a breaker unit that is opened when a load current is interrupted, and a capacitor and a reactor that are connected in parallel to the breaker unit.

4. The DC circuit breaker according to claim 3, wherein the self-excited-oscillation type DC circuit breaker unit includes a second metal oxide arrester that is connected in parallel to the capacitor, the reactor, and the breaker unit and suppresses an overvoltage after interruption of a direct current.

5. A DC circuit breaker comprising a fuse breaker unit to interrupt a large current with a fuse, wherein
   the fuse breaker unit includes a high-speed disconnector that is connected in parallel to
   the fuse and is opened when a fault current is detected, and
   the fuse breaker unit includes a first metal oxide arrester that is connected in parallel to the fuse and the high-speed disconnector and suppresses an overvoltage after interruption of a direct current, and a self-excited-oscillation type DC circuit breaker unit that is connected in series to the fuse breaker unit and interrupts a small current with a self-excited oscillation method.

6. The DC circuit breaker according to claim 5, wherein the self-excited-oscillation type DC circuit breaker unit includes a breaker unit that is opened when a load current is interrupted, and a capacitor and a reactor that are connected in parallel to the breaker unit.

7. The DC circuit breaker according to claim 6, wherein the self-excited-oscillation type DC circuit breaker unit includes a second metal oxide arrester that is connected in parallel to the capacitor, the reactor, and the breaker unit and suppresses an overvoltage after interruption of a direct current.

* * * * *